US012427545B2

(12) United States Patent
Gaughan et al.

(10) Patent No.: US 12,427,545 B2
(45) Date of Patent: Sep. 30, 2025

(54) SCREENING HOPPER

(71) Applicant: ECOFILL GROUP LIMITED, Leeds Yorkshire (GB)

(72) Inventors: Trevor Gaughan, Leeds (GB); David Bowie, Suffolk (GB)

(73) Assignee: ECOFILL GROUP LIMITED, Leeds Yorkshire (GB)

( * ) Notice: Subject to any disclaimer, the term of this patent is extended or adjusted under 35 U.S.C. 154(b) by 315 days.

(21) Appl. No.: 18/269,400

(22) PCT Filed: Dec. 23, 2021

(86) PCT No.: PCT/GB2021/053425
§ 371 (c)(1),
(2) Date: Jun. 23, 2023

(87) PCT Pub. No.: WO2022/136880
PCT Pub. Date: Jun. 30, 2022

(65) Prior Publication Data
US 2024/0238844 A1 Jul. 18, 2024

(30) Foreign Application Priority Data

Dec. 23, 2020 (GB) ...................................... 2020511
Mar. 22, 2021 (GB) ...................................... 2103974

(51) Int. Cl.
*B07B 1/16* (2006.01)
*B02C 21/02* (2006.01)
(Continued)

(52) U.S. Cl.
CPC .............. *B07B 1/16* (2013.01); *B02C 21/026* (2013.01); *B02C 23/02* (2013.01); *B02C 23/08* (2013.01);
(Continued)

(58) Field of Classification Search
CPC .. E02F 5/226; E02F 7/06; B02C 2/007; B02C 18/2225; B02C 18/2291;
(Continued)

(56) References Cited

U.S. PATENT DOCUMENTS 3,850,364 A 11/1974 Robbins
3,971,716 A 7/1976 Foreman
(Continued)

FOREIGN PATENT DOCUMENTS

CN 108479945 A * 9/2018 ............. B02C 13/06
CN 210 215 180 U 3/2020
(Continued)

OTHER PUBLICATIONS

"International Search Report" in PCT/GB2021/053425, mailed Apr. 21, 2022.
(Continued)

*Primary Examiner* — Jared O Brown
(74) *Attorney, Agent, or Firm* — William H. Bollman

(57) ABSTRACT

An apparatus for producing a construction material for use in the building industry is disclosed. The apparatus comprises a hopper (10) which includes a trough (11) having a base section and an open top to allow material to be added to the hopper. The base section of the hopper includes a grinding array (24). A separation array (152) is deployed above the open top with the separation array comprising a plurality of elongate tines (151), each having a first end and a second end, mounted parallel to each other, and secured at least at one end to a support means.

14 Claims, 12 Drawing Sheets

(51) Int. Cl.

| | |
|---|---|
| ***B02C 23/02*** | (2006.01) |
| ***B02C 23/08*** | (2006.01) |
| ***B07B 1/00*** | (2006.01) |
| ***B07B 1/28*** | (2006.01) |
| ***B07B 1/46*** | (2006.01) |
| *B02C 18/22* | (2006.01) |
| *E02F 5/22* | (2006.01) |
| *E02F 7/06* | (2006.01) |

(52) U.S. Cl.
CPC ................ *B07B 1/005* (2013.01); *B07B 1/28* (2013.01); *B07B 1/4654* (2013.01); *B02C 18/2225* (2013.01); *B02C 18/2291* (2013.01); *E02F 5/226* (2013.01); *E02F 7/06* (2013.01)

(58) Field of Classification Search
CPC ........... B02C 2013/28618; B02C 2013/28672; B02C 21/02; B02C 21/026; B02C 23/02; B02C 23/08; B02C 23/14; B09B 3/35; B09B 2101/40; B09B 2101/45; B09B 2101/90; Y02W 30/52; Y02W 30/58; Y02W 30/91; B07B 1/00; B07B 1/005; B07B 1/12; B07B 1/15
See application file for complete search history.

(56) References Cited

U.S. PATENT DOCUMENTS

| | | | | |
|---|---|---|---|---|
| 6,354,524 | B1 * | 3/2002 | Nakayama | B02C 25/00 241/34 |
| 2002/0148917 | A1 * | 10/2002 | Koenig | B02C 18/16 241/30 |
| 2019/0112785 | A1 * | 4/2019 | McCabe | B07B 1/005 |

FOREIGN PATENT DOCUMENTS

| | | | | |
|---|---|---|---|---|
| IN | 210053921 | U | | 2/2020 |
| JP | H04 210251 | A | | 7/1992 |
| JP | 2002239409 | A | * | 8/2002 |
| JP | 2003300019 | A | * | 10/2003 |
| JP | 2004230330 | A | * | 8/2004 |
| JP | 2009142765 | A | | 7/2009 |
| JP | 2010188324 | A | * | 9/2010 |
| WO | 2023285838 | A1 | | 1/2023 |

OTHER PUBLICATIONS

"Written Opinion of the International Preliminary Examining Authority" in PCT/GB2021/053425, mailed Feb. 9, 2023.
"Notification of Transmittal of the International Preliminary Report on Patentability" in PCT/GB2021/053425, mailed Apr. 4, 2023.

* cited by examiner

SCREENING HOPPER

FIELD OF THE INVENTION

The present invention relates to an apparatus for reducing the particle size of a particulate material and screening the particulate material based on particle size of a particulate material. The particular material contemplated is for use in the construction industry and can comprise soil, rubble and the like. The apparatus can be transported between sites and is also suitable for mixing the particulate material with a binder material prior to use in the civil engineering projects.

BACKGROUND TO THE INVENTION

During the construction of structures such as buildings, roads etc., there is usually a requirement to remove large quantities of soil, sub-soil and in particular clays, from the site to enable foundations to be properly laid down. It should be noted that any reference herein to a soil includes also a sub-soil, clay or mixture thereof. The soil on which the foundations are to rest needs to be prepared to ensure it is sufficiently stable and strong to bear the subsequent load over an extended period. Once the foundations are in position, the volume around the foundations needs to be filled in. Often the soil removed can contain materials from a previous construction such as concrete, brickwork and other rubble. Inevitably the soil material removed comprises materials of widely varying size, hardness and friability. Moreover, the high moisture content of such soil material often makes it unsuitable for immediate reuse. This in itself makes the soil material unsuitable for use. Firstly, the largest particle size can be 10s of centimetres in diameter. Second, the range of particle sizes can be too great and would result in an unstable soil structure. Additionally, the soil material can include contaminants arising from the land's former use such as oil, plastics materials etc. This makes re-use of the soil material taken out problematic, and in particular it is unlikely that the material as removed can simply be put back into the hole formed, once the foundation work has been completed. Treatment of the material is usually required to prevent contaminants from leaching out.

Commonly, the soil material is simply disposed of in a landfill site. The hole formed by removal of the soil material is then filled in with aggregate often transported from a location remote from the site.

This inevitably incurs costs, not least because of the requirements for large amounts of energy simply to transport all the materials between locations.

It will be recognised by those skilled in the art that providing a material of the correct average particle size (which is typically achieved by a screening process) from a soil is a difficult task. One of the main reasons for the difficulty is water, adsorbed onto and/or absorbed into the particulate material. The moisture acts to bind particles together through surface tension and strongly affects the soils flow and plasticity characteristics. In order to be able to properly screen materials so that they can be utilised in forming a construction material, the moisture content normally needs to be controlled. This is either by providing drying to the soil materials or alternatively to add additional water during the screening process to increase the fluidity of the soil.

It is an object of the current invention to provide an apparatus to assist in re-use of portions of the soil, sub-soil and clay material removed and so reduce the amount of material which needs to be removed and also to be brought into the site. In this way the energy requirements in any construction are reduced and also the use of virgin natural materials also reduced. The hopper and screen disclosed can be utilised where prior art devices cannot work. The reduction in particle size facilitates interaction with any binder added.

SUMMARY OF THE INVENTION

According to a first aspect of the invention, there is provided an apparatus for producing a construction material for use in the building industry, the apparatus comprising a hopper, the hopper including a trough having a base section and an open top to allow material to be added to the hopper, the base section of the hopper including a grinding array;

- a separation array deployed above the open top, the separation array comprising a plurality of elongate tines, each having a first end and a second end, mounted parallel to each other, and secured at least at one end to a support means.

The tines act to filter out oversized material from entering the hopper and so potentially damaging the grinding array, and also to break down large particulate or agglomerate material.

Preferably, the elongate tines are mounted at an angle to the horizontal, sloping from the first end to the second end to facilitate material too large to pass through to move off the separation array. Further preferably, the apparatus comprises a plurality of separation arrays arranged end to end.

Preferably, a tine is spring mounted in a mount at the first end to reduce damage to a tine. Further preferably, the mount is held in a split cup arrangement to facilitate construction.

Preferably, a tine is operably connected to a motor which acts to cause the tine to vibrate. Further preferably, the tine vibrates in a circular or elliptical motion. Also, further preferably, the tine vibrates at 800-3000 rpm.

Preferably, a tine includes a serrated edge, mounted to be upward facing, to aid in breaking down the size of material.

Preferably, the grinding array comprises a plurality of grinding elements secured to a frame, each grinding element comprising an axle mounted for rotation in either direction about an axis parallel to that of neighbouring grinding elements;

- one or more grinding array motors to drive rotation of the grinding elements;
- each axle having a plurality of annular collars in spaced arrangement along the axle;
- extending from the outer edge of each collar, one or more teeth;
- neighbouring axles being so disposed that the collars of neighbouring axles interleave with each other.

Preferably, a collar includes one or more axial bosses, such as cylindrical bosses, which co-operate on rotation with the teeth of a neighbouring grinding element to comminute material.

Preferably, a collar has a plurality of teeth and one or more of the teeth has a longer length than the other teeth on the collar. A longer tooth can act to clean excess material from a neighbouring axle and also co-operate with bosses on a collar of a neighbouring grinding element.

Preferably, the distance between the axles of neighbouring grinding elements is adjustable to enable the largest size of particle produced to be changed.

Conveniently, the or each grinding array motor is a direct drive motor to increase the control over the rotation of a grinding element.

Optionally a grinding array motor is linked to a plurality of grinding elements in a series arrangement. Alternatively, a grinding array motor is linked to a plurality of grinding elements in a parallel arrangement.

The shaft of the or each grinding array motor is preferably mounted by a resilient mount to absorb unwanted vibrations with the tension in the resilient mount further preferably adjustable to take account of the material being processed.

A grinding array motor is preferably operably linked to a grinding element to drive rotation of a grinding element in either direction. The speed of rotation is optionally variable and further optionally is from 100-300 rpm.

A grinding array is preferably mounted such that the slope of the grinding array is at −0°-35°, and preferably 0°-25° to the horizontal. This provides for material to be biased to move in a particular direction along the grinding array.

Conveniently, the hopper has side walls, including a first side wall having a grille to filter particulate material having a particle size less than a set value,

- a second side wall including an outlet aperture through which oversize material is removed from the hopper.

Optionally, the hopper is resiliently mounted to aid in reducing the occurrence of material becoming jammed within the grinding array.

Preferably, the hopper includes a central bar mounted across the hopper above the grinding array to act to protect the grinding array from material being dropped directly on the grinding array. The central bar is further preferably supported by a plurality of struts which strengthens the central bar against impact but also reduces the gap through which material can fall into the hopper and effectively puts an upper limit on the size of the material which can be put into the hopper. This therefore acts to protect the grinding array from dropping of too big a mass to the grinding array.

The grille preferably comprises a plurality of bars, further preferably parallel to each other to filter material exiting the hopper through the grille. The bars are yet further preferably rectangular or square in cross-section. The gap between the bars is chosen to suit the material being processed and can be from 25-150 mm, further preferably from 25-50 mm and yet further preferably 30-40 mm. The bars are conveniently supported by cross-pieces to provide increased resistance to deformation.

A hopper motor is conveniently attached to the base of the hopper to vibrate the base of the hopper to aid in passage of the material through the grinding array. Alternatively or additionally the motor is attached to the grille to aid the passage of material through the grille.

Conveniently, the hopper is mounted above an endless belt the endless belt receiving the comminuted and sieved material exiting the hopper, the endless belt being driven for movement by a motorised roller,

- a binder tank, having a control valve and feeder to direct a binder material onto the material processed in the hopper, further conveniently being added to the material on the endless belt;
- the apparatus being mounted on tracks and having a drive motor to drive the tracks to enable the apparatus to be moved between locations.

According to a second aspect of the invention, there is provided a construction material for use in construction, said construction material including material produced for example from soils sub-soils and clays in an apparatus in accordance with the first aspect, the construction material including a binder.

Preferably the construction material is utilised as fill; capping; sub-base and/or base layers in earthworks, highways and footpaths.

According to a third aspect of the invention there is provided a grinding array comprising a plurality of grinding elements secured to a frame, each grinding element comprising an axle mounted for rotation in either direction about an axis parallel to that of neighbouring grinding elements;

- one or more motors to drive rotation of the grinding elements;
- each axle having a plurality of annular collars in spaced arrangement along the axle;
- extending from the outer edge of each collar, one or more teeth;
- neighbouring axles being so disposed that the collars of neighbouring axles interleave with each other.

The rotation of the axles, and the interleaving arrangement of the collars provides for increased efficiency in comminuting a material to the pre-set desired size.

Preferably, a collar includes one or more axial bosses, such as cylindrical bosses, which co-operate on rotation with the teeth of a neighbouring grinding element to comminute material.

Preferably, a tooth has a trapezoidal shape or optionally alternatively has a scimitar shape. The edge of a tooth is further preferably a sharp edge to assist in cutting through material.

Optionally, a collar has a plurality of teeth and one or more of the teeth has a longer length than the other teeth on the collar. A longer tooth can act to clean excess material from a neighbouring axle and also co-operate with bosses on a collar of a neighbouring grinding element.

Preferably, the distance between the axles of neighbouring grinding elements is adjustable to enable the largest size of particle produced to be changed.

Conveniently, the or each motor is a direct drive motor to increase the control over the rotation of a grinding element.

Optionally a motor is linked to a plurality of grinding elements in a series arrangement. Alternatively, a motor is linked to a plurality of grinding elements in a parallel arrangement.

The shaft of the or each motor is preferably mounted by a resilient mount to absorb unwanted vibrations with the tension in the resilient mount further preferably adjustable to take account of the material being processed.

A motor is preferably operably linked to a grinding element to drive rotation of a grinding element in either direction.

The speed of rotation is optionally variable and further optionally is from 100-300 rpm.

A grinding array is preferably mounted such that the slope of the grinding array is at −10°-35°, and preferably 0°-25° to the horizontal. This provides for material to be biased to move in a particular direction along the grinding array.

The grinding array is conveniently mounted in a hopper, the hopper comprising a trough to hold material to be comminuted, the hopper having a base section including the grinding array,

- the hopper having side walls, including a first side wall having a grille to filter particulate material having a particle size less than a set value,
- a second side wall including an outlet aperture through which oversize material is removed from the hopper.

The hopper acts to contain the material being processed, during the processing.

Optionally, the hopper is resiliently mounted to aid in reducing the occurrence of material becoming jammed within the grinding array.

The hopper is conveniently mounted on legs which firstly allows the apparatus to be moved between different locations. Moreover, the length of at least one of the legs is adjustable to enable the base of the hopper to slope and aid the comminution process.

Preferably, the hopper includes a central bar mounted across the hopper above the grinding array to act to protect the grinding array from material being dropped directly on the grinding array. The central bar is further preferably supported by a plurality of struts which strengthens the central bar against impact but also reduces the gap through which material can fall into the hopper and effectively puts an upper limit on the size of the material which can be put into the hopper. This therefore acts to protect the grinding array from dropping of too big a mass to the grinding array.

The grille preferably comprises a plurality of bars, further preferably parallel to each other to filter material exiting the hopper through the grille. The bars are yet further preferably rectangular or square in cross-section. The gap between the bars is chosen to suit the material being processed and can be from 30-150 mm, further preferably from 25-50 mm and yet further preferably 30-40 mm. The bars are conveniently supported by cross-pieces to provide increased resistance to deformation.

A motor is conveniently attached to the base of the hopper to vibrate the base of the hopper to aid in passage of the material through the grinding array. Alternatively or additionally the motor is attached to the grille to aid the passage of material through the grille.

Conveniently, the hopper is incorporated in a treatment apparatus, the apparatus comprising a hopper mounted above an endless belt the endless belt receiving the comminuted and sieved material exiting the hopper, the endless belt being driven for movement by a motorised roller, a binder tank, having a control valve and feeder to direct a binder material onto the material processed in the hopper, further conveniently being added to the material on the endless belt;

the apparatus being mounted on tracks and having a drive motor to drive the tracks to enable the apparatus to be moved between locations.

According to a further aspect of the invention, there is provided a method to allow soil material of high moisture content material with the addition of a binder to be used to create a homogenous mixed material. The apparatus can be utilised to process a soil with a moisture content of 6% above its Optimum Moisture Content, optionally greater than 8% and further optionally greater than 10% with the addition of a binder to create a homogenous mixed material. In addition, the apparatus can be utilised to process soil materials having a plasticity index of greater than 20, preferably greater than 30 and further preferably greater than 40. The liquid limit of the soils which can be processed using the hereindescribed apparatus in accordance with the invention is greater than 40, preferably greater than 50, further preferably greater than 60 and yet further preferably greater than 70.

BRIEF DESCRIPTION OF THE DRAWINGS

The invention is now described with reference to the accompanying drawings which show by way of example, one embodiment of a screening hopper. In the drawings.

DETAILED DESCRIPTION OF THE INVENTION

Figure 1:
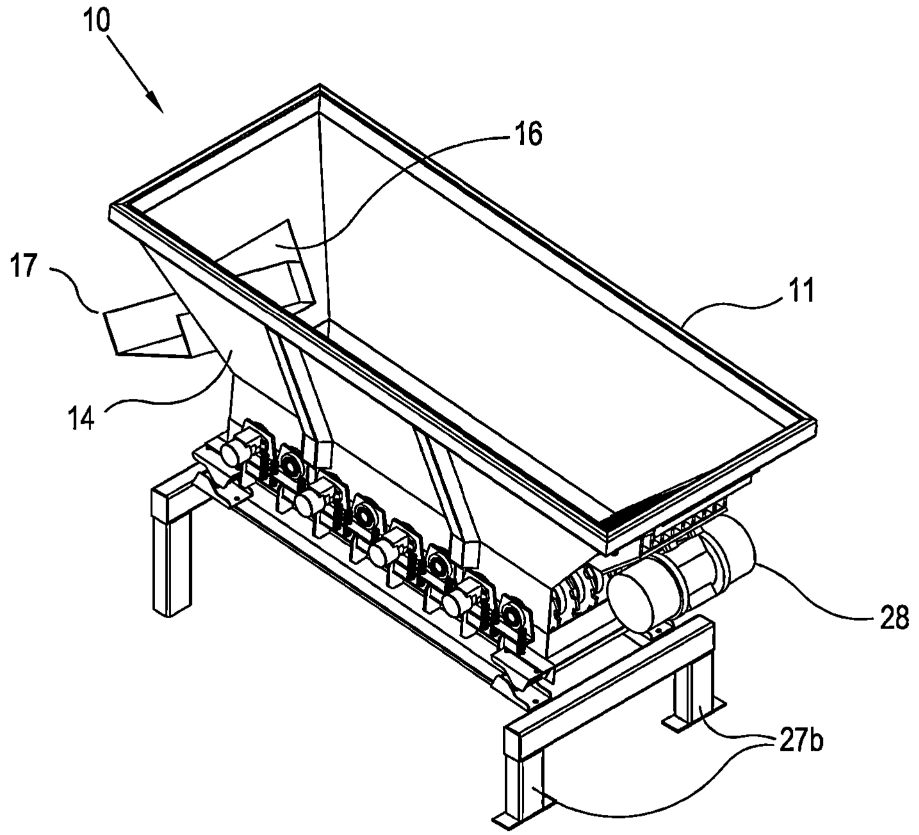
FIG. 1 is a perspective view of a first embodiment of screening hopper.
Figure 2:
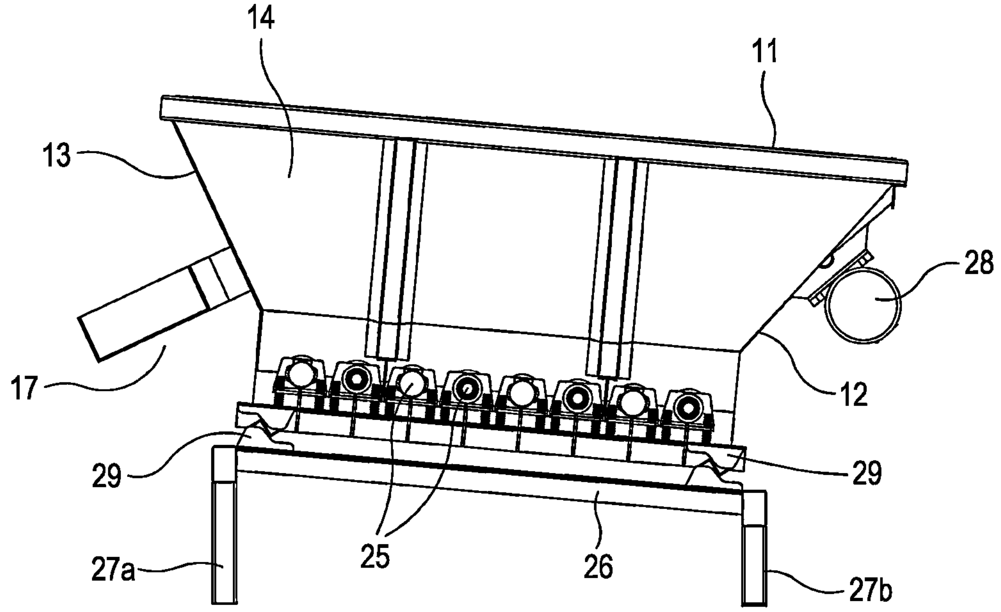
FIG. 2 is a side view of the screening hopper of FIG. 1.
Figure 3:
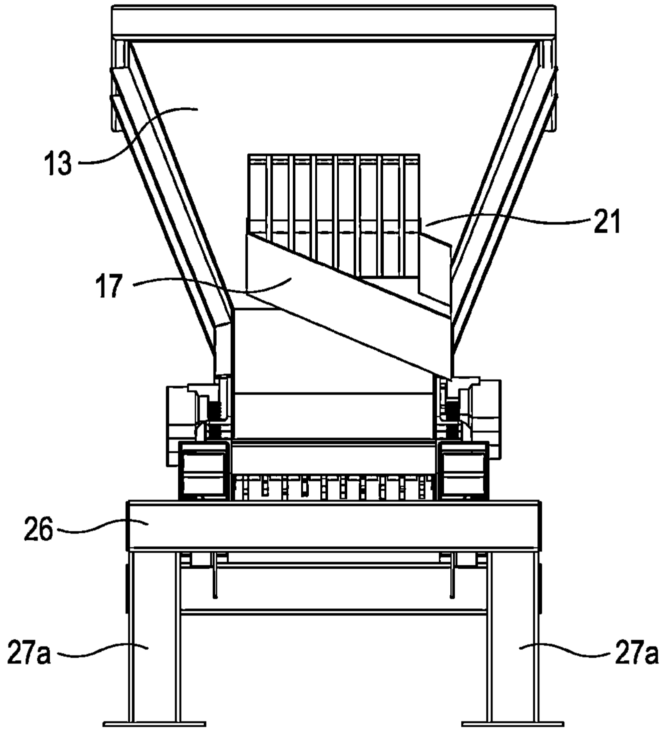
FIG. 3 is an end elevation of the screening hopper of FIG. 1.
Figure 4:
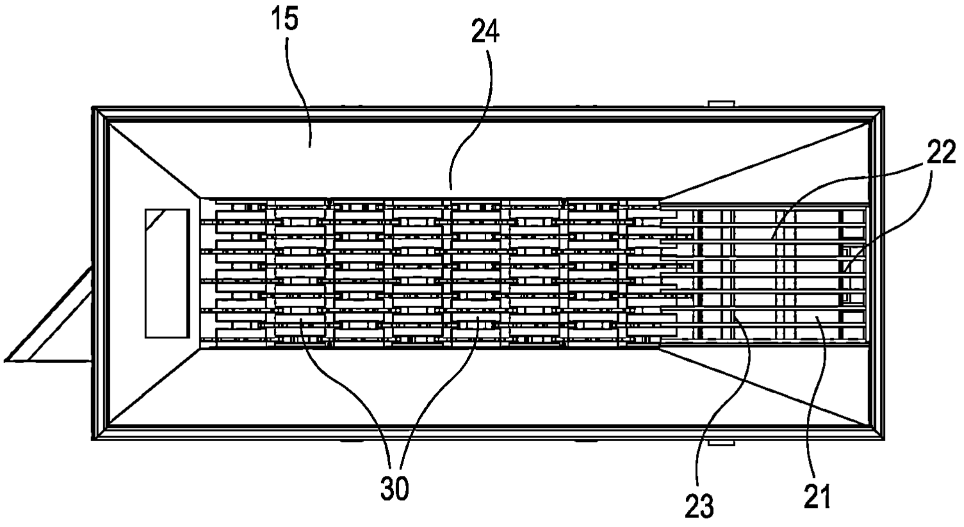
FIG. 4 is a plan view of the screening hopper of FIG. 1.
Figure 5:
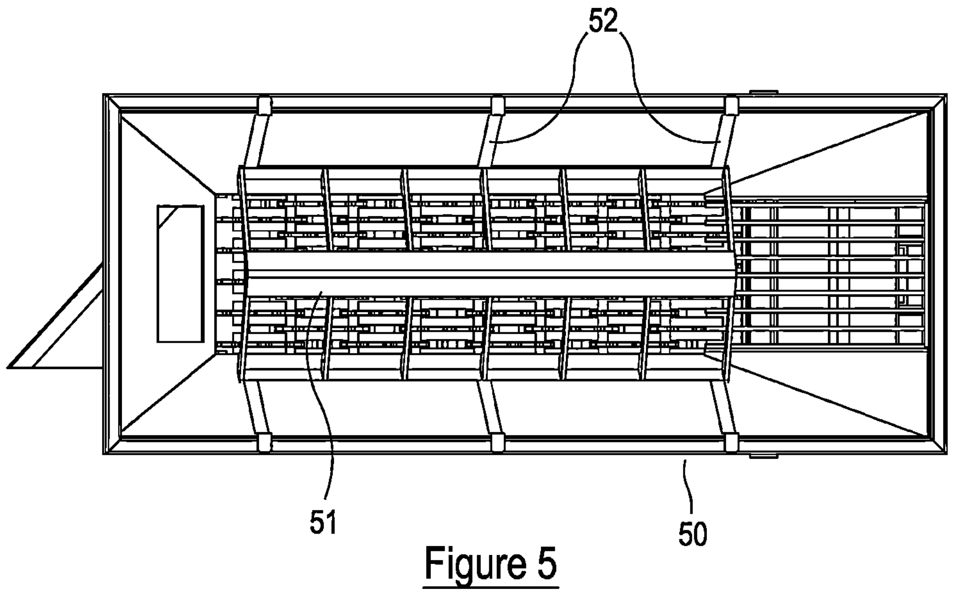
FIG. 5 is a plan view of a second embodiment of screening hopper.
Figure 6:
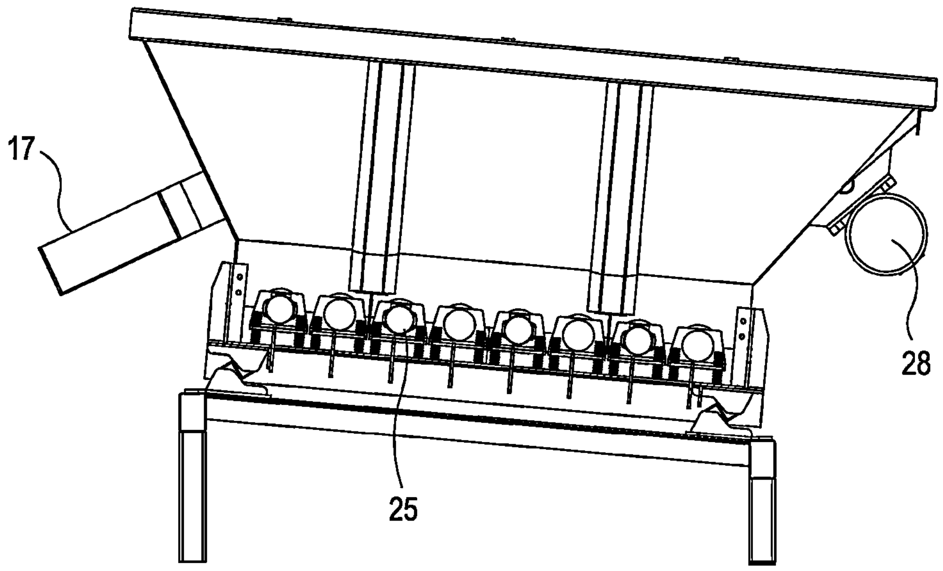
FIG. 6 is a first partially transparent side view of the second embodiment of screen hopper.

The soil—often referred to in the industry as spoil, muck or overburden—material removed, particularly from a brown-field site, when constructing the foundations of new structures such as unclassified roads, tracks, and paths, is usually unsuitable to simply be put back into the excavation formed by its removal once the foundations are finished. The particulate size and shape of some of the material, along with the spread of the range of sizes would lead to too many voids within the structure, and to eventual instability of the sub-base on which foundations rest as the replaced material settled. The soil material is therefore unsuitable and needs to be engineered. Prior art methods known require that the soil material be transported to a remote location and that filler such as a graded aggregate material be brought onto the site. The energy expenditure in carrying this out is high even when delivery and removal of material is co-ordinated. The present invention enables soil, and in particular clay, material removed from a site, to be processed on or close to the construction site and then reused, thus reducing energy consumption overall.

The present invention is described initially with reference to FIGS. 1-4 which show a first embodiment of screening hopper, generally referenced 10, positioned to receive soil, sub-soil or clay material from a feeder (not shown). The material is loaded from the feeder onto the grille 21 of the hopper 10, a portion of the material, predominantly oversize and not broken down in the hopper, following processing, passing out of the trough 11 through the exit 16 and down the discharge ramp 17. Another portion of the material is conveyed on an endless belt running beneath the trough 11 to a further container (not shown).

In more detail, the hopper 10 has the general configuration of an upturned hollow frusto-rectangular pyramid and is formed of a robust material such as steel. The open end of the hopper 10 is, for example, around 1200 mm, although the overall dimensions will be chosen to suit the particular task being undertaken. The trough 11 comprises a base and, extending upwardly therefrom, first and second end walls 12, 13 and side walls 14, 15 formed of sheet metal steel. Incorporated into the first end wall 12 of the trough 11 is a grille 21 comprising a plurality of parallel metal bars 22 supported by cross-pieces 23. The bars 22 are preferably of rectangular cross-section which gives strength in the vertical whilst allowing for maximum open void space for small material to pass through, so aiding passage of material and to minimise damage to the bars 22, of diameter of from 10-20 mm and set apart to provide a gap between neighbouring bars 22 of from 25-50 mm, and preferably 30-40 mm. This allows material of diameter less than this value to fall through and onto an endless belt (see below) for transport to a collector. The passage of material through the bars 22 is aided by the motor 28 vibrating whose action causes the bars 22 to vibrate. The motor 28 is also advantageously deployed to also vibrate the rest of the screening hopper 10. In a further embodiment, not illustrated, the motor 28 can be mounted on a framework secured to the outside of the base of the trough 11. This reduces the effect of the action of the motor 28 on the grille 21, but increases and confines vibration in the screening hopper 10 to the trough 11 and to the grinding array 24. This is, especially preferable in a non-illustrated embodiment of the invention which does not include a grille 21 formation, with all of the material of the required size passing through the grinding array 24.

In the base of the hopper 10 is a grinding array 24, around 600 mm in length, (also referred to as a Rotoscreen™) which acts to break down large agglomerations of material into particles of smaller size. The array can also be used, as described below to convey material either towards and onto the grille 21 or through the exit 16. In order to drive the grinding process, a plurality of direct drive motors 25 is provided. Other types of motors can be utilised, but it has been found advantageous to utilise direct drive motors, preferably hydraulically transmitted, to improve the control over the comminution process.

The hopper 10 and motors 25 are supported by a support frame 26. The mounting usually incorporates resilient mounts such as spring mounts to aid throughput by damping down unwanted vibrations. Individual motors can be mounted to the support frame using mounts incorporating a resilient material, which thus allows a degree of freedom of motion of the motor and the grinding element 30 which it drives. In the embodiments shown herein, the trough 11 is supported on resilient mounts 29, such as those known in the trade as Rosta™ mounts. The vibration motor 28 is selected to suit the mass and throw required for material being processed and vibrates the complete body on which mounts 29 are secured to the support frame 26. This minimises the risk of jamming during operation due to material becoming stuck between adjacent grinding elements 30 as the motors are able to flex on the resilient mounts sandwiched between adjustable compression springs, thus opening up the space between adjacent grinding elements 30. From FIG. 2 it can be seen that the legs 27*a* of the frame 26 are longer than the legs 27*b* which introduces a slope in the base of the hopper 10 from the exit down towards the grille 21. The slope biases movement of particulate material towards the grille 21 and so maximises the opportunity of smaller material to pass between the bars 22 of the grille 21. Furthermore the length of the legs is advantageously adjustable to enable the angle of slope to be changed as required. A slope of from 0°-35° has been found to be effective, with a range of 0°-25° being preferable.

In other embodiments, the hopper is mounted on a sloping surface to provide the desired slope for the grinding elements 30. In these embodiments the hopper need not include legs. It has been surprisingly found that a hopper as described above, can be utilised to screen materials in that material to be separated is deposited into a hopper as described above such that the material falls directly onto the grille, thus separating the material into fractions of size depending on the grille elements. The fraction having the larger particle size remains in the hopper and can be removed from the site for further treatment or disposal.

In more detail and in relation to the array of grinding array 24, this comprises a plurality of grinding elements 30, each axially mounted for rotation about a horizontal axis extending across the base of the trough 11. It will be recognised that the grinding element can be incorporated into a hopper as illustrated above, but can be utilised without being incorporated into a hopper. The grinding elements 30 are mounted to be rotatable in either direction about their axis. The rotation of a grinding element 30 is driven by the drive motor 25 to which the grinding element 30 is coupled. It is convenient for there to be a drive motor for each grinding element 30 and vice versa. The operation of the motors is governed by a programmable logic controller (PLC) allowing a set series of operations to be carried out without the need for constant supervision by an operator.

In another embodiment, each direct drive motor is dedicated to provide rotation in one direction only, with the direction of drive of a grinding element 30 being governed by a switch, coupling the grinding element 30 to the particular drive motor driving rotation in the desired direction. In a further embodiment, the power to the grinding elements is provided by a diesel motor which powers an electric generator, which electric generator then drives one or more hydraulic pumps.

It has been found advantageous to use hydraulic drive motors, although electric motors can also be used. When using hydraulic motors these can be set up either in series or in parallel. The use of a series arrangement is simpler to execute and requires less hydraulic fluid, but has the disadvantage that if there is a fault with one motor in the series, then all the motors in that series arrangement need to be stopped until repair is effected. The motors selected typically are capable of driving the rotation of a grinding element at up to 100-300 rpm, providing ~800 Nm torque. The speed of rotation can be varied to suit the required performance and the material being processed. Additionally, adjacent grinding elements can be run at different speeds.

Each grinding element 30 comprises a central column 31 which is rotatably mounted, and whose rotation is driven by a motor 25. Coupled for rotation with the central column 31 is a plurality of teeth 32 operably mounted to an annular collar 33 which is secured about the central column 31. In the exemplified embodiment the teeth 32 extend perpendicularly from the column 31, but the angle of extension can be chosen to suit the particular use. Rotation of the grinding element 30 therefore causes the teeth 32 to impact against the material, and to break the material into smaller pieces. The process is, in one mode of operation, accelerated by causing adjacent grinding elements 30 to rotate in the opposite direction to that of its neighbour or neighbours. The teeth 32 co-operate to comminute the material in that the momenta imparted separately by neighbouring grinding elements act in concert with one another. In another mode of operation, the grinding elements 30 rotate each in the same direction about their axes, which not only acts to comminute the material to a greater extent than when acting in a contra-rotatory manner, but also to convey the material in a desired direction. For example, rotation is such that the uppermost teeth are moving in the desired direction so that overall momentum is imparted to the material in that direction: for example the momentum is imparted to the direction of the grille 21, where the particles of the appropriate size can fall between the bars 22 of the grille 21 and onto the conveyor beneath. Rotation of the grinding elements 30 in the same direction, or in the opposite direction to that which they had been rotating, can also be utilised to remove blockages caused by material becoming jammed in the grinding elements 30. A PLC can optionally sense loading via a hydraulic transducer, and a trigger set to cause reversal of the rotation direction to clear the blockage.

In a further embodiment, additional axially extending protrusions, for example cylindrical boss can be provided on the collars 33 of the grinding elements 30. The cylindrical bosses co-operate with the teeth 32 during operation of the grinding elements 30 to increase the shearing forces acting on the particles and increasing the rate of comminution. Typically, as with the gaps left between rotating parts of the grinding elements 30, the axial gap between the end of the bosses and the nearest tooth 32 is kept at around 30 mm to allow particles of smaller than that size to pass through.

The shape of the teeth 32 used can be selected depending on the material being acted on and the physical state of the material at the time of processing. For example the shape of a tooth 32 can be selected from, but not limited to, one having a rectangle-shaped section or alternatively other polygonal shapes or having curved configuration such as that of a scimitar blade. The edges of a tooth 32 can be sharp, although this feature has the disadvantage of being likely to be too readily blunted in use by the material being treated.

In a further mode of action, adjacent grinding elements 30 can be caused to rotate in the same direction, but at different angular velocities, causing a shearing force to be imparted across the width of the material, which acts to break up the material into smaller particles. In a yet further mode of action, adjacent grinding elements 30 can be caused to rotate in the opposite direction, but at different angular velocities, causing a different shearing force to be imparted across the width of the material.

Using one or more of the above described modes of action allows the forces imparted to the material to be varied to those which are likely to be most effective in reducing the particle size of the material, dependant on the crystal structure of the material and its friability.

The axial separation between the central columns 31 of adjacent grinding elements 30 is adjustable and set to provide the same distance, measured in the radial direction, between a collar 33 and the end of the teeth 32 on the nearest collar 33. Moreover the axial separation between neighbouring collars 33 attached to neighbouring columns 31 is likewise adjustable to that between neighbouring bars 22 of the grille 21. This allows the diameter of material produced to have a consistent maximum value between the material passing through the grille 21 and the grinding elements 30.

The throughput of the screening hopper 10 described above depends on the material being processed. The size of the hopper 10 can also influence the process volume. Alternatively, two or more screening hoppers 10 can be placed and/or secured together to provide increased capacity on a particular site.

Referring now to FIGS. 5-9, these illustrate a second embodiment of screening hopper 50. The majority of features of the second embodiment are as for the first embodiment. The second embodiment includes however a protective central bar arrangement to reduce damage to the grinding elements 30 from accidental damage either from the material being loaded into the hopper or from an operator trying to clear blockages in a non-sanctioned manner. Although the drive of the motors can be set such that if rotation of the grinding elements drops below an expected value, then the rotation is reset to attempt to free the blockage, for example by rotating neighbouring grinding elements 30 in the opposite direction, relative to neighbouring grinding elements, this may not always be successful. Action may then need to be taken by an operator.

In some embodiments, the screening hopper 50 includes a centrally deployed bar 51 which is maintained in position by support struts 52, approximately 50 mm in diameter and around 200 mm apart. Should material therefore be dropped directly into the body of the screening hopper 50, rather than onto the grille 21, the bar 51 protects the grinding elements 30 from direct impact. Moreover, the bar 51 and support struts 52 force an operator to take care when attempting to remove a blockage, such as by forcing material through the grinding elements by mechanical means. Additionally, the bar 51 acts to prevent material of too great a size, for example greater than 250 mm diameter, from being put into the hopper 50, which would be broken up only with difficulty and slow down the overall rate of comminution.

FIGS. 11-19 illustrate a third embodiment of the screening hopper. The third embodiment comprises many of the same features as described above for the first embodiment. However, the third embodiment includes a separation array to remove material, delivered to the hopper 150 for processing, above too great a size and direct said oversize material away from the grinding elements. In this embodiment, the separation array comprises a plurality of tines, arrayed in a parallel configuration. The dimensions of the tines and the separation therebetween are dependent on the precise application of the hopper to which they are fitted.

Figure 15:
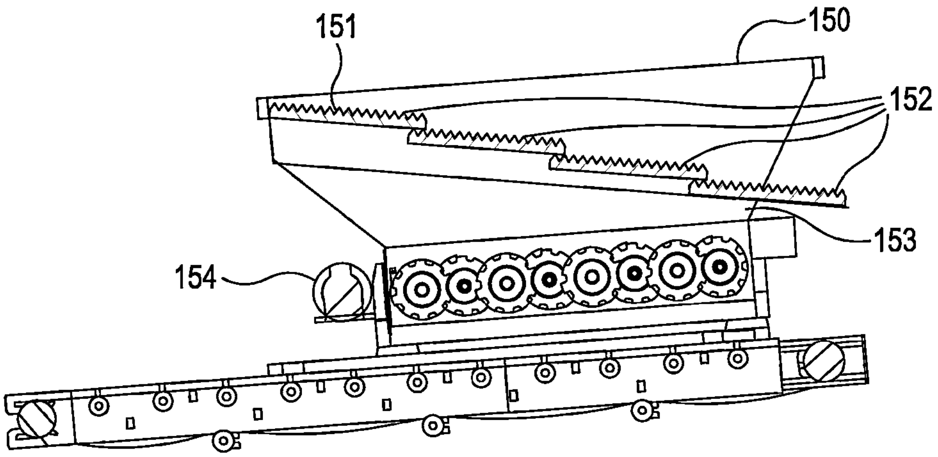
FIG. 15 is a partially transparent side view of the third embodiment of the screening hopper of FIG. 11 with the hopper walls removed to illustrate the arrangement of tine arrays.

A plurality of tines 151 is deployed in an array, the tines 151 being parallel to one another. In the third embodiment four separate arrays 152 of tines 151 are fitted along the length of the hopper 150, as shown in FIG. 15. The arrays 152 each slope in the same direction and co-operate to direct oversize material towards an outlet in the side wall of the hopper 150. In an alternative embodiment, not illustrated, there may only be a single array 152 of tines 151. The number of tines in an array, and the number of arrays, are selected according to the material being processed.

Figure 13:
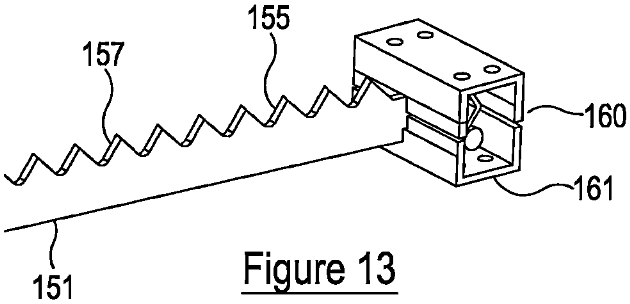
FIG. 13 shows an example of a single tine and fixing apparatus.
Figure 14:
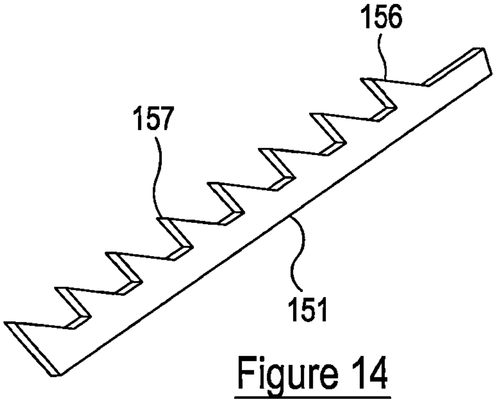
FIG. 14 shows an example of a toothed tine.
Figure 13A:
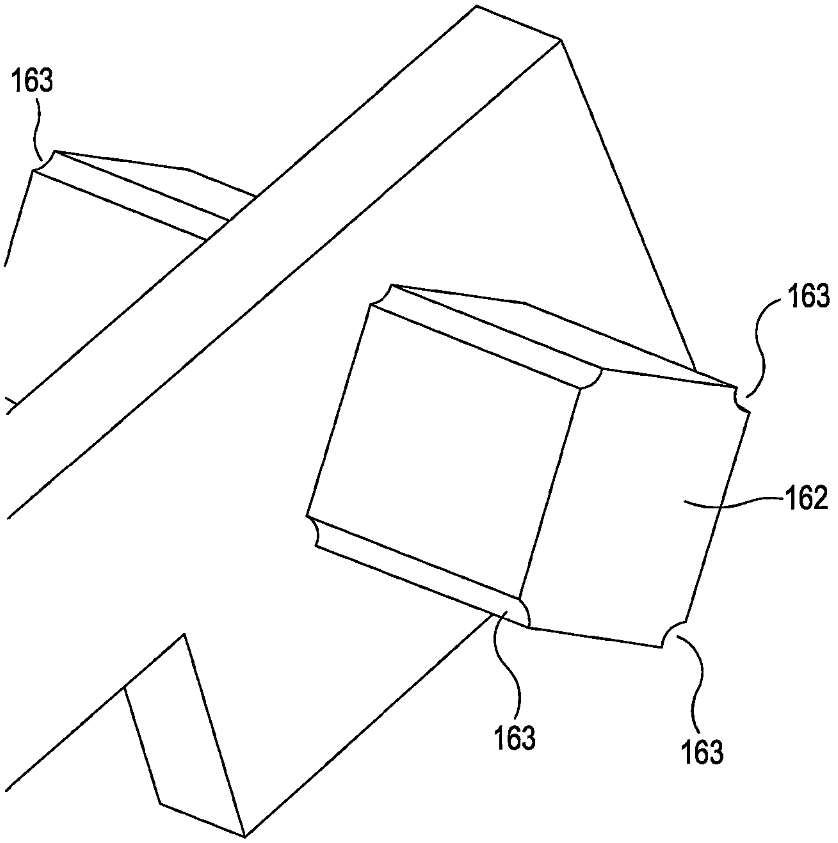
FIG. 13*a* shows a mount block for the apparatus of FIG. 13.

In the example shown in FIG. 15 the tines 151 run parallel to the major axis of the hopper 150 and in a downward sloping direction towards the end wall 153. In one embodiment, the tines 151 are formed of a hard steel and are resiliently or spring-mounted to one end of the array: for example using a mount as marketed by Rosta™. The use of a spring mount is preferable to being welded in position as there is a lower risk of fracture of the join. The tine is held on a cross-beam by means of a split cup 160, the cross-beam 161 being the bottom half of the cup 160 and a bolt on the top half clamps the tine in place and compresses rubber bars. A square, milled block 162 as shown in FIG. 13*a* has a radius 163 cut into the corners to take the radius of a rubber bar. A square block is attached to each side on the tine by means of dowel pins and a friction weld.

In one embodiment, a square bar is welded to the in-use upper end. The bar is then clamped into a split cup. Four hard rubber bars in the corners are compressed by clamping to hold the bar in position. Effectively, when working, the tines vibrate at a frequency depending on rubber grade and screen box settings. The vibration applied to the arrays is either by a vibration motor or an eccentric shaft. This provides the array with a vibration in a speed range of 800 to 3000 rpm. The vibration and speed have to be balanced. Typically the vibrations are produced in circular or elliptical mode. In effect, the tines act as a saw to reduce the size of the material put into the hopper. In action, the tines cause hard stones to lift and rotate. Soils and soft material are cut down in size and fall through the gaps between the tines.

The tines therefore can be mounted for vibration, being caused to vibrate by means of a motor 154 secured to the hopper 150. In a further non-illustrated embodiment, the vibration of the tines may be halted independently from the hopper.

The tines are optionally fixed at one end, and free at the opposite end (FIGS. 13 and 15), or in a further, less preferable non-illustrated embodiment, the tines are fixed at both ends.

In one embodiment, as shown in Figured 13 and 14, each tine 151 has a plurality of teeth 155/156 each of which optionally has a sharp edge 157. In FIG. 13, the teeth 155 have a shape approximate to that of an equilateral triangle, whilst in FIG. 14, the teeth 156 are shaped as a right-angled triangle. In some applications the sharp edge is serrated, straight edged, or curved although other suitable configurations are within the scope of this invention. Moreover, the teeth 155/156 in the illustrated embodiment are triangular in shape, however other shapes can be used such as, but not limited to, rectangular or curved depending on their suitability for the precise application. Furthermore, in some embodiments the tines do not have teeth but can alternatively have a sharpened straight or curved edge.

In some embodiments, not illustrated, multiple arrays of tines are used, optionally combining different types of teeth to cut complex mixtures that may be processed by the hopper. The angle at which the tines run relative to the grinding array below is optionally adjustable.

The tines thus function to both reduce the particle size of the processed material and also to separate material based on its size. Material that is larger than the gaps between the tines will go over the top of the tines, the vibration of the tines cuts a proportion of this large material to be small enough to fall between the tines and reach the grinding elements. Material smaller than the gaps between the tines simply falls through the gaps and reaches the grinding elements without being cut by the tines. Material that is not cut by the tines and is not small enough to fall through the tine arrangement passes out of the hopper, not reaching the grinding element thus protecting the hopper from blockage or damage from large material.

The distance between tines is set to an aperture to suit the grinding elements below and also for the type of processed material to be obtained. In one example, the plurality of tines can be set to have a 70 mm gap between adjacent tines. In this example material larger than 70 mm diameter is moved over the top of the tines and possibly reduced in particle size through engagement with the tines, particularly where a tine has a serrated or sharpened edge.

In a further embodiment, not illustrated, the grinding array is substituted by an array of tines as described above. This simplifies the action of the apparatus.

Figure 10:
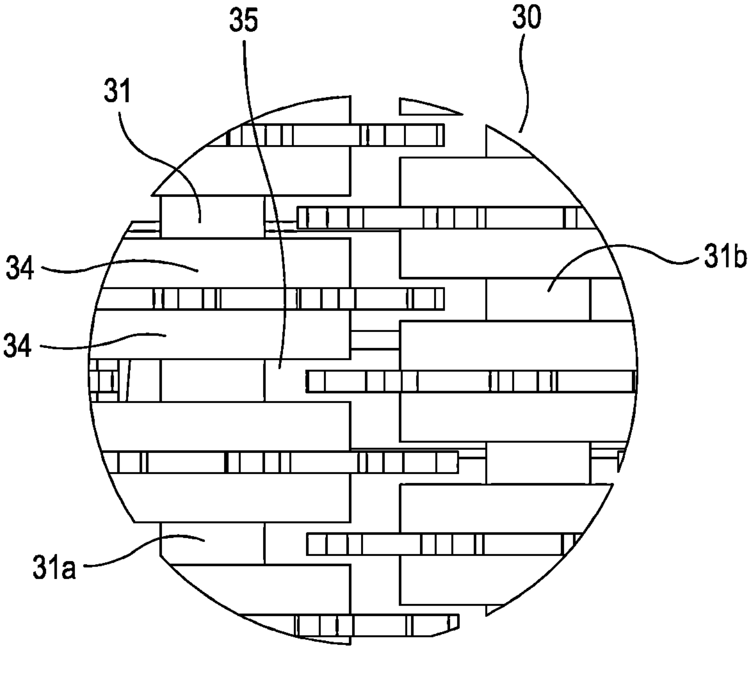
FIG. 10 is an enlarged view of the area B of FIG. 9.
Figure 11:
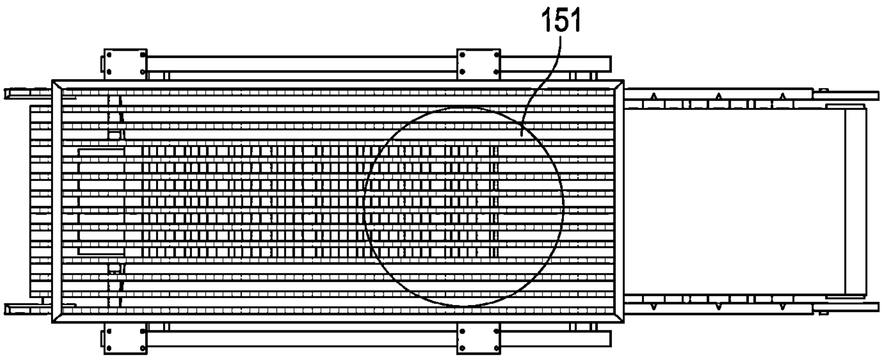
FIG. 11 is a plan view of a third embodiment of a screening hopper.
Figure 12:
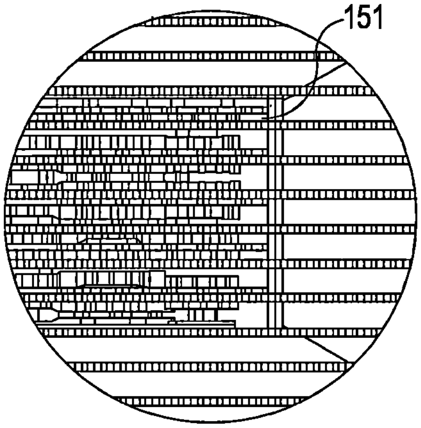
FIG. 12 is an enlarged view of the area D of FIG. 11.
Figure 16:
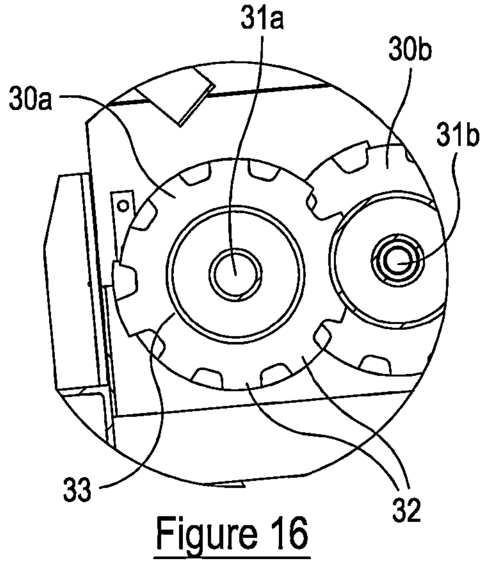
FIG. 16 is an enlarged view of area C of FIG. 8 and FIG. 15.
Figure 17:
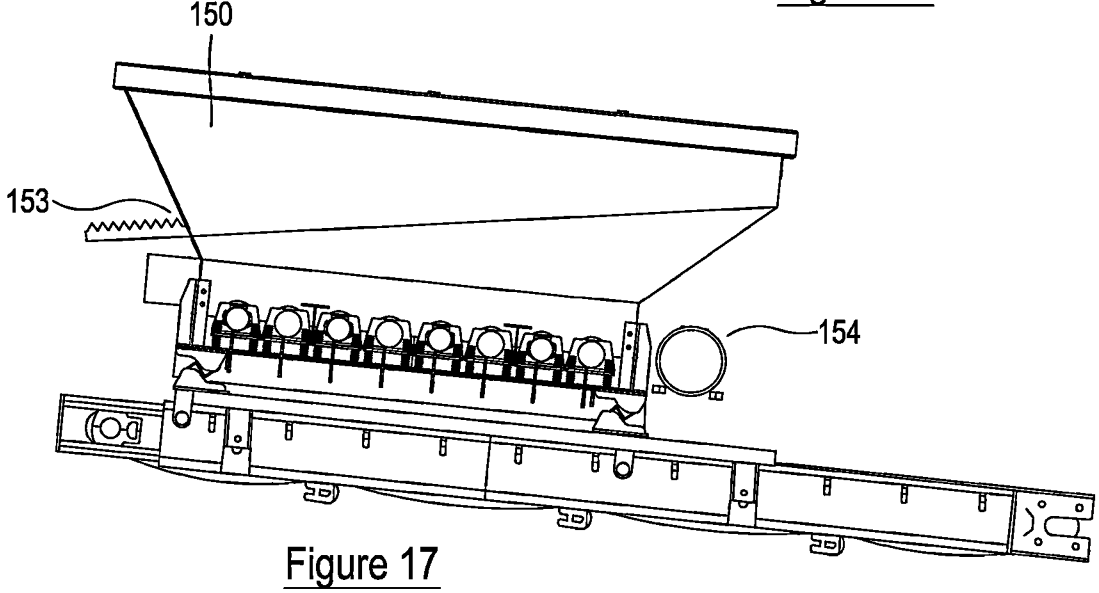
FIG. 17 is a partially transparent side view of the third embodiment of the screening hopper of FIG. 11.
Figure 18:
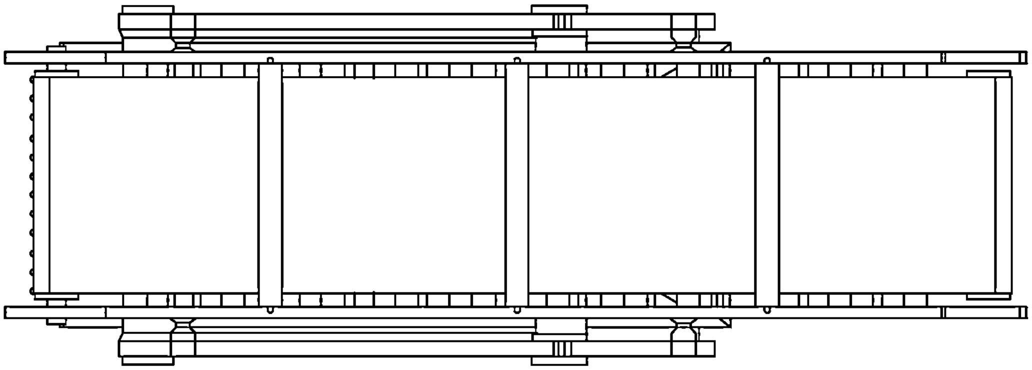
FIG. 18 is a top view of the third embodiment of the screening hopper of FIG. 11.
Figure 19:
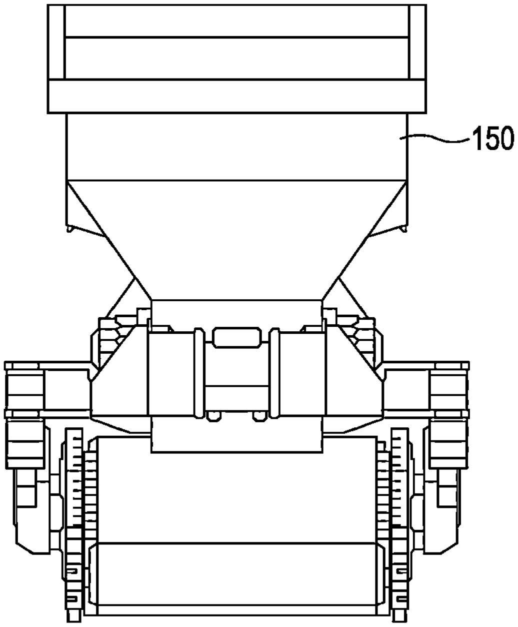
FIG. 19 is an end view of the third embodiment of the screening hopper of FIG. 11.
Figure 20:
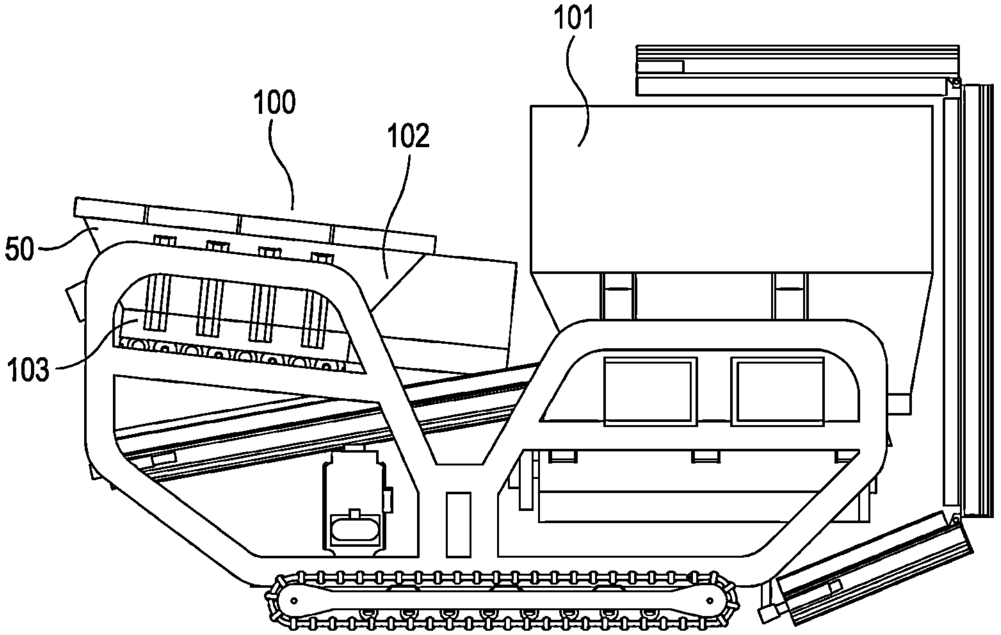
FIG. 20 is a side view of a combined screening hopper and mixer.
Figure 21:
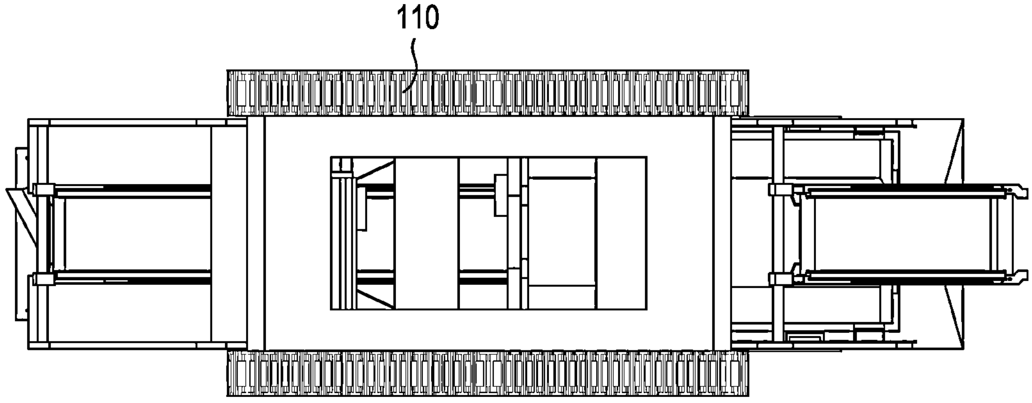
FIG. 21 is an end view of a combined screening hopper and mixer of FIG. 20.
Figure 22:
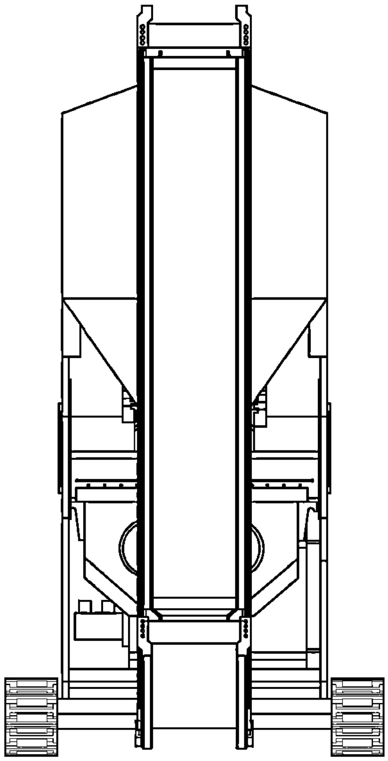
FIG. 22 is a base view of a combined screening hopper and mixer of FIG. 20; d
Figure 23:
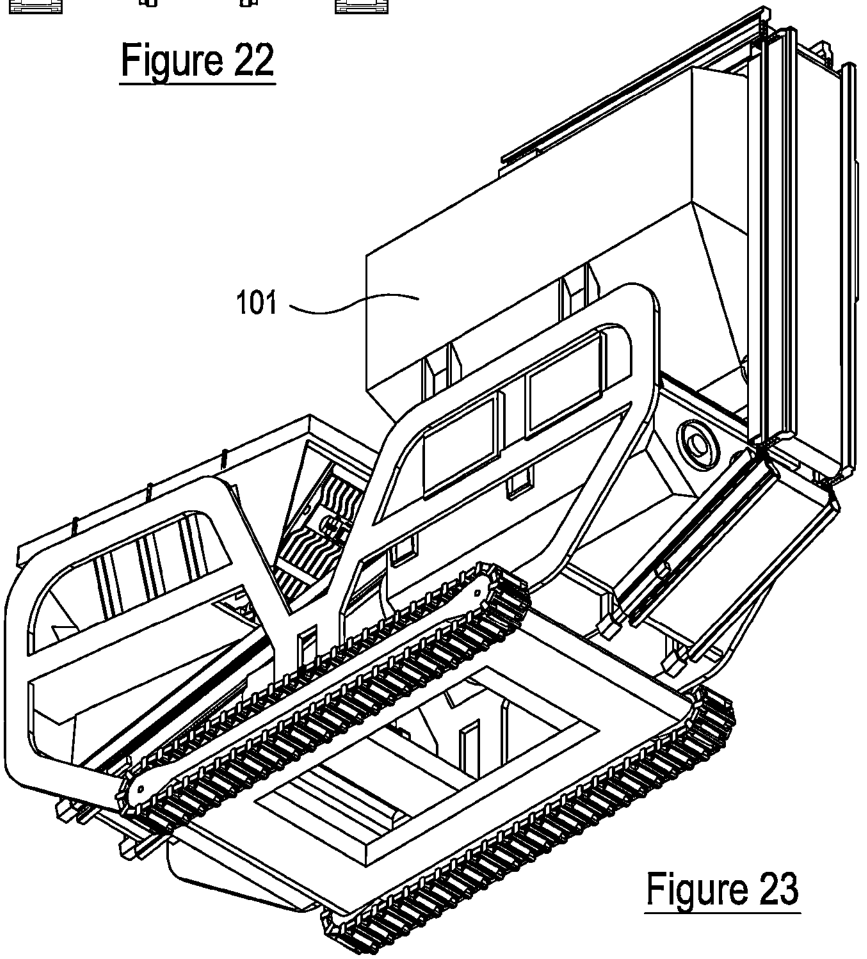
FIG. 23 is a perspective view of a combined screening hopper and mixer of FIG. 20.

Regarding the grinding elements 30, these are shown in more detail in FIGS. 10 and 16. In these Figures, two grinding elements 30*a*, 30*b* can be seen. Each grinding element 30*a*, 30*b* comprises a central rotatably mounted column 31*a*, 31*b*. The grinding elements 30 are formed into an array in which the axes of the columns 31 (see FIG. 8) are parallel to each other in the same plane. In a further embodiment, not illustrated, one or more of the columns 31 can be offset from the plane common to the other columns. Secured to each of the columns 31 is a plurality of axially separated collars 33, each collar extending away perpendicularly from the column 31. Around the outer edge of the collar 33 is a plurality of teeth 32 which engage and comminute the material being processed. In the illustrated embodiment, each tooth 32 is approximately rectangular in shape. However, other shapes can be used as required, such as a trapezium having two parallel sides, or shapes having curved edges, such as a scimitar. In order to provide additional strength to the grinding elements 30, each collar is sandwiched between two discs 34, with the teeth 32 extending beyond the outer diameter of the discs 34. In addition, in a further non-illustrated embodiment, one or more of the teeth is longer than the other teeth, and of sufficient length such that its outer edge almost reaches the column 31 of an adjacent grinding element. This allows the tooth to clean material adhered to the column 31 from the column 31 and enhance the continued running of the grinding elements. In a preferred embodiment, two of the teeth, on opposite sides of a collar 33 are of longer length which balances out the grinding element 30. From FIG. 10 it can be seen that the collars 33 of adjacent grinding elements 30*a*, 30*b* are interleaved axially which aids in the grinding process. The gaps, designated as 35, between the end of a tooth 32 and the column 31 of a neighbouring grinding element 30, between the outer edges of adjacent discs 34 and between axially adjacent collars 33 is set to be the same as the distance between adjacent parallel bars 22. Material reduced in particle size to below that set as a minimum falls through the grinding elements 30 and onto a conveyor below.

Figure 7:
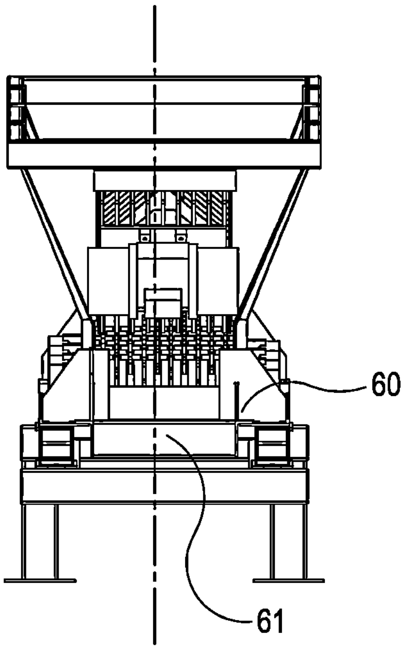
FIG. 7 is a transparent end view of the second embodiment of screen hopper.
Figure 8:
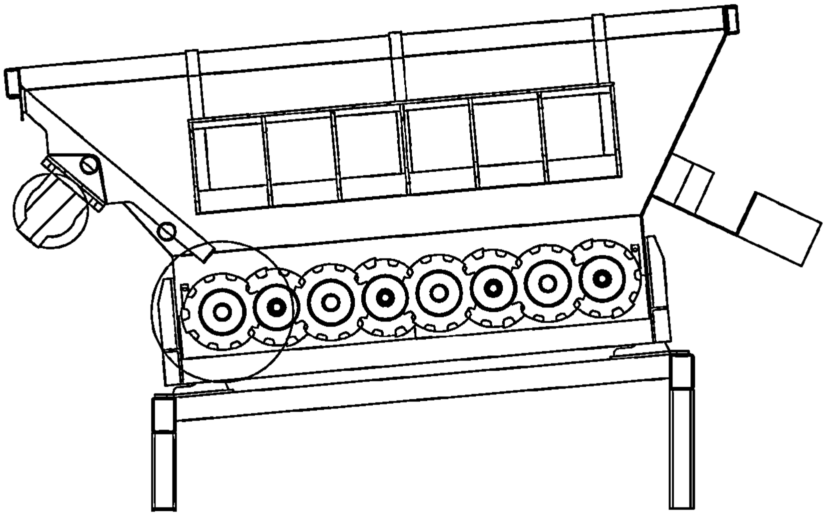
FIG. 8 is a second partially transparent side view of the second embodiment of screen hopper.
Figure 9:
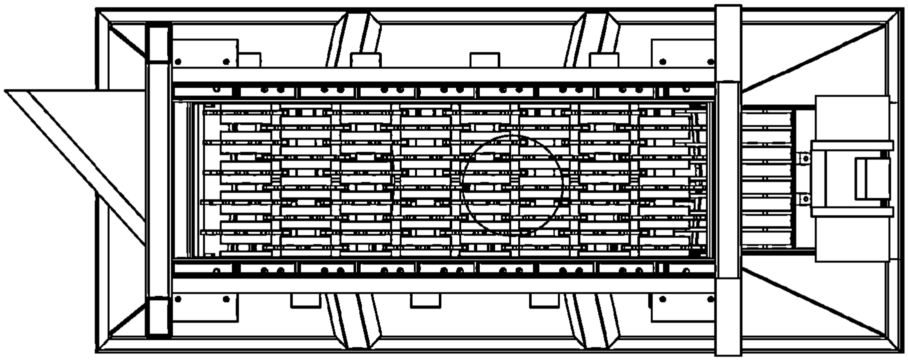
FIG. 9 is a partially transparent plan view with hopper walls removed of the second embodiment of screen hopper.

The conveyor 60 can be seen in FIG. 7 and comprises an endless belt 61 mounted about motor-driven rollers to drive the belt 61 to transport material on the belt 61.

The angle at which the grille is set, relative to the grinding array can be set from 0° to 90°, depending on the material being processed. In a further embodiment, not illustrated, the grille 21 is not included and that face of the trough is simply a sheet material, as the other side walls. In this embodiment the processed material falls through the grinding array 24 in the base of the trough 11. In a yet further embodiment, a woven wire screen mesh is utilised and not a grille as described above. In a still yet further embodiment, the angle of the grille is adjustable to take account of the material being processed.

In use therefore, the screening hopper 50 is placed in position and the heights of the legs 27*a*, 27*b* adjusted to provide the desired slope of the base of the screening hopper 50. The power supply is connected to the motors and these switched on. In some embodiments, such as the one shown below in FIGS. 20-23, the power supply is transported as part of the treatment apparatus 100. A feeder for the material to be processed is positioned to feed the material in a measured fashion onto the grille 21 of the screening hopper 50. The material is preferably tested to determine its moisture content and if it is above a defined value, the material can be dried prior to being processed by the hopper 50, for example in a drier bed, or by simply left in sunlight with occasional turning. An alternative means of lowering the moisture content is for example to add a dehydrating additive. In a hopper of dimensions then a material having a moisture content of >25% w/w can be processed at a rate of around 100 tonnes/hour, whilst a material of moisture content of ~12.5% w/w can be processed at a rate of around 300 tonnes/hour.

The gaps between the bars 22 of the grille 21 are set to be the required value as are the gaps within the grinding array 24. The rollers driving the conveyor belt 61 are started, causing the conveyor belt 61 to move in readiness to transport material falling through the grille 21 and grinding array 24. The hopper 50 is switched on causing the entire apparatus to vibrate by means of the motor 28, and in particular the grille 21. The motors 25 are activated to rotate the grinding elements 30 in readiness for addition of the material.

The material is then fed (controlled flow through serrated tines above, so as not to choke rotors) onto the grille 21 by means known in the art. The material of size less than the gaps between the bars 22 tends to fall through onto the conveyor belt 61, on which the material is transported for deposit into a collector or into a vessel for treatment with a binder material as described below. This material does not therefore need to pass through the grinding elements, and its direction straight onto the conveyor 61 reduces the quantity of material passing through the grinding array. Material remaining in the trough 11 tends to fall under gravity onto the grinding array 24. Initially, the grinding elements 30 of the grinding array 24 are caused to rotate in a contra-rotatory direction to a neighbouring grinding element 30. This action provides maximum shearing force to the material and causes larger lumps of material to be broken down to a sufficient size to pass through the grinding elements 30. Alternatively, the slope biases the comminuted material to move in a direction towards the grille 21 where, again, the smaller material falls through to the conveyor belt 61. In order to reduce the chance of the grinding elements 30 becoming jammed with material, the grinding elements can be caused to run on a cycle of a defined time period, for example 10 seconds in one direction, followed by a further defined period in the opposite material. Any material which is at risk of jamming the rotation by being caught between grinding elements 30, is thus expelled from therebetween. Where required the grinding elements 30 can be caused to rotate in the same direction which can act to free material caught in the grinding elements 30.

When sufficient oversize material, too large to pass through the grinding elements 30, has built up, the direction of rotation of the grinding elements 30 can be made to be all in the same direction and such that the material is effectively transported towards and out of the exit 16 and down the ramp 17 to be collected for disposal or re-use. If grinding elements 30 are all running in the same direction oversized material is passed/conveyed over the top of grinding elements 30 and ejected over at the end. In this running mode the forward teeth on one rotor push material which has been grabbed down, while on the adjacent rotor the teeth are rising. This causes material to be cut to pass through.

The material which passes through the trough 11 and onto the conveyor belt 61 can be reused, possibly following further treatment. An example of an apparatus for further treatment of the processed material is shown in FIGS. 20-23. In the treatment apparatus, generally referenced 100, the screening hopper 50 described above is incorporated to provide the processed material into the mixing vessel 101. The hopper 50 is maintained preferably during operation in a sloping configuration with the end 102 lower than the end 103. The slope of the hopper 50 can be altered as required in that the end 102 mounted on a pivot mount, with a hydraulic lifting mechanism provided to lift and/or lower the end 103. The angle to the horizontal of the slope can be varied to be from 0°-25°. In the mixing vessel 101, the comminuted material is mixed together with a binder, along with a quantity of water to increase the effectiveness of the binder. As an example of a binder is a hydraulic binder which, following mixing with water, hardens in both air and water and in particular a hydraulic road binder which refers to a pre-formed, ready-to-use hydraulic binder. (The binder can be mixed together with the comminuted material, at a specified water content, to produce a Hydraulically Bound Mixture. Typical values for the amount of binder used are from 1.0-15.0% w/w and preferably 1.5-5.0% w/w. The comminution of the material assists interaction between the material and the binder by increasing the surface area of the material. Preferably, the binder is added to the comminuted material prior to the material entering the mixing vessel 101, whilst the material is still on the conveyor. The thickness of the layer of material on the conveyor is preferably maintained below 60 mm depth. This allows sufficient penetration of the binder material used into the particles on the conveyor. Addition can be achieved through the use of an auger arrangement to control the feed rate or alternatively a spreader plate. (the auger feeds onto a spreader plate to cover material as it moves forward on conveyor).

The treatment apparatus 100 is mounted for movement between sites on tracks 110, driven by an on-board motor. The height of the apparatus 100 is from 3.5-15.0 m, preferably 3.5-6.0 m.

Figure 24:
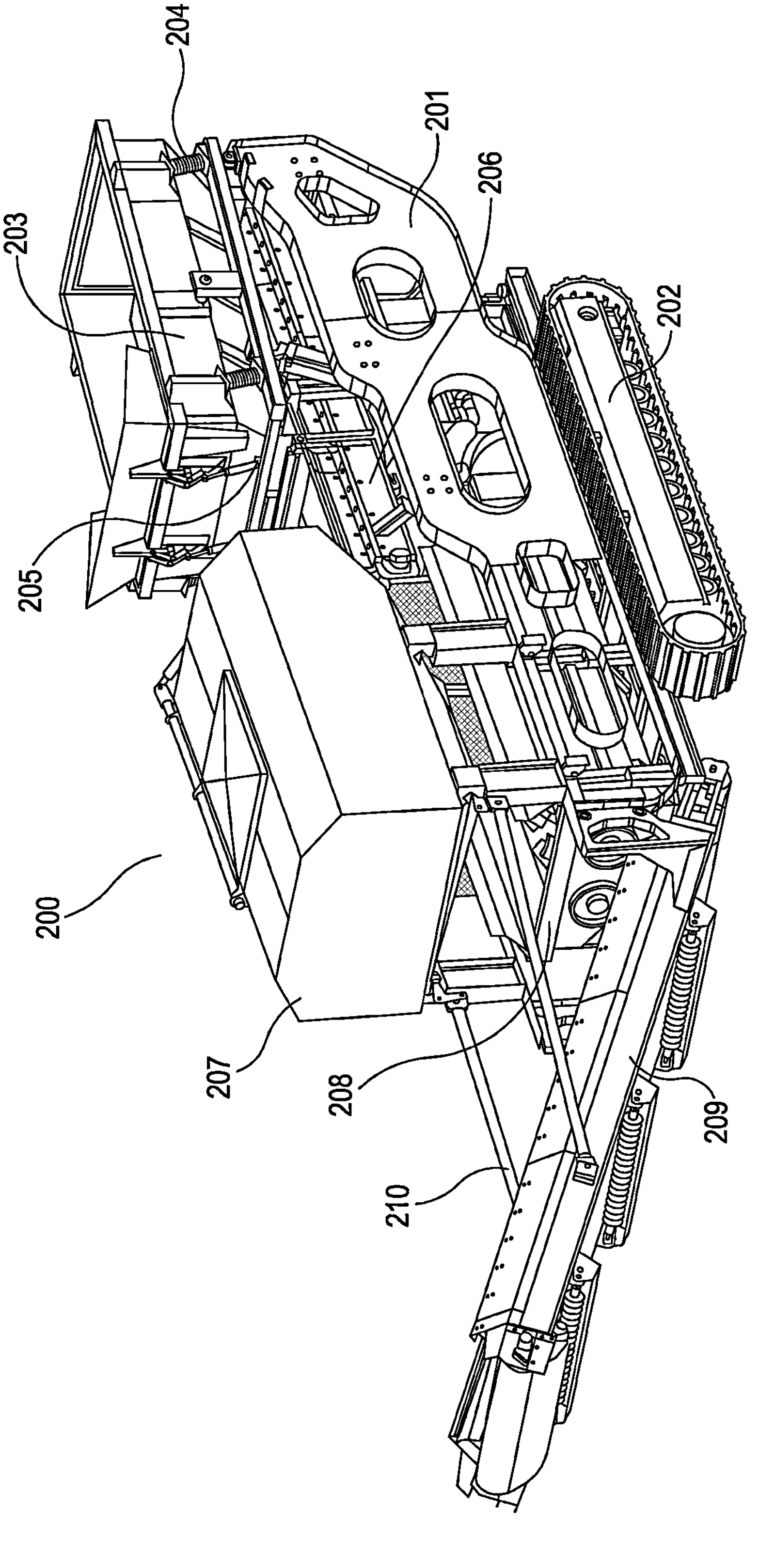
FIG. 24 is a perspective view of a further embodiment of a combined screening hopper and mixer.

In FIG. 24 is shown a further embodiment of a treatment apparatus 200. The apparatus 200 is substantially as described above, but is of lower profile to enable transport between work locations to be undertaken more easily. The apparatus 200 comprises a chassis 201, mounted for movement on tracks 202. A hopper 203, mounted on springs 204 is located at one end of the apparatus 200. A grinder array 205, as described in the above embodiments is housed within the hopper 203, with material from the hopper 203 being discharged onto a feeder conveyor 206. The feeder conveyor 206 conveys material leaving the hopper 203 beneath a silo 207 in which a binder mixture to bind the material is housed. As the material passes beneath the silo, the binder mixture is discharged from the silo, and the material and binder mixture then enter a mixer 208 where they are mixed together. Once mixing is achieved, the mix is discharged via the discharge conveyor 209. The discharge conveyor 209 can be moved between a working position (shown) to a storage/transport position by means of the hydraulic supports 210.

As indicated in the Background screening materials suitable for further processing into construction materials is not an easy process due to the moisture content within a soil. The two main parameters which need to be addressed for a standard screening process are the plasticity and the liquid limit of the material. Using the criteria below, then a material having an optimum moisture content is sought.

The optimum moisture content determines the moisture content that the construction material is to be compacted at in order to achieve the maximum dry density. The dry density is a measure of how the material will respond to a load supported thereon. It is accepted within the industry that the optimum value for compaction of the optimum moisture content lies within 2% of that value. The National Earthworks specification (UK) states that after compaction, 90-100% of the maximum dry density must be achieved: a value which will normally be known for a given material. This directly relates to the construction material achieving the maximum loading/stiffness.

The liquid limit is the water content at which a soil changes from plastic to liquid behaviour. The importance of the liquid limit test is to classify soils and different soils have different liquid limits. The plasticity index is a measure of the plasticity of a soil. The plasticity index is the difference between the liquid limit and the plastic limit. As examples, soils with a high plasticity index tend to be clay, those with a lower plasticity index tend to be silt, and those with a plasticity index of 0 (non-plastic) tend to have little or no silt or clay. A standard scale for the plasticity index is as follows:

0—Non-plastic
(1-5)—Slightly plastic
(5-10)—Low plasticity
(10-20)—Medium plasticity
(20-40)—High plasticity
>40 Very high plasticity Given the above, to bring a material to the state in which it can be screened can be energy intensive and time-consuming. The present invention addresses the problem by more efficiently bringing a soil into a desired usable state for forming into a construction material. As such the apparatus and method allow soil material of high moisture content material with the addition of a binder to be used to create a homogenous mixed material. The apparatus can be utilised to process a soil with a moisture content of 6% above its Optimum Moisture Content, optionally greater than 8% and further optionally greater than 10% with the addition of a binder to create a homogenous mixed material. In addition, the apparatus can be utilised to process soil materials having a plasticity index of greater than 20, preferably greater than 30 and further preferably greater than 40. The liquid limit of the soils which can be processed using the hereindescribed apparatus in accordance with the invention is greater than 40, preferably greater than 50, further preferably greater than 60 and yet further preferably greater than 70.

The invention claimed is:

1. An apparatus for producing a construction material for use in the building industry, the apparatus comprising a hopper (10), the hopper (10) including a trough (11) having a base section and an open top to allow material to be added to the hopper (10), the base section of the hopper (10) including a grinding array (24);

a separation array (152) deployed within the open top, the separation array (152) comprising a plurality of elongate tines (151), each having a first end and a second end, mounted parallel to each other, and secured at least at one end to a support.

2. The apparatus according to claim 1, wherein the plurality of elongate tines are mounted at an angle to a horizontal line, sloping from the first end to the second end.

3. The apparatus according to claim 1, wherein the apparatus comprises a plurality of separation arrays arranged end to end.

4. The apparatus according to claim 1, wherein a tine of the plurality of elongate tines is spring mounted in a mount at the first end to reduce damage to the tine.

5. The apparatus according to claim 4, wherein the mount is held in a split cup (160) arrangement to facilitate construction.

6. The apparatus according to claim 1, wherein a tine of the plurality of elongate tines is operably connected to a motor which acts to cause the tine to vibrate.

7. The apparatus according to claim 6, wherein the tine vibrates in a circular or elliptical motion.

8. The apparatus according to claim 6, wherein the tine vibrates at 800-3000 rpm.

9. The apparatus according to claim 1, wherein a tine of the plurality of elongate tines includes a serrated edge, mounted to be upward facing.

10. The apparatus according to claim 1, wherein a hopper motor (28) is conveniently attached to the base of the hopper to vibrate the base of the hopper.

11. The apparatus according to claim 1, wherein the grinding array comprises a plurality of axles and a plurality of grinding elements (30) secured to a frame, each grinding element (30) comprising one of the plurality of axles mounted for rotation in either direction about an axis parallel to axes of neighbouring ones of the plurality of grinding elements;

one or more grinding array motors to drive rotation of the grinding elements;

each axle having a plurality of annular collars in spaced arrangement along the axle;

extending from the outer edge of each collar, one or more teeth;

neighbouring ones of the plurality of axles being so disposed that the collars of the neighbouring axles interleave with each other.

12. The apparatus according to claim 1, wherein the hopper is resiliently mounted.

13. The apparatus according to claim 1, wherein the hopper is mounted above an endless belt, the endless belt receiving the comminuted and sieved material exiting the hopper, the endless belt being driven for movement by a motorised roller.

14. The apparatus according to claim 13, wherein the apparatus includes a binder tank, having a control valve and feeder to direct a binder material onto material processed in the hopper, the binder material being added to the material on the endless belt;

the apparatus being mounted on tracks and having a drive motor to drive the tracks to enable the apparatus to be moved between locations.

* * * * *